C. W. CATHCART.
COUPLING.
APPLICATION FILED MAY 10, 1919.

1,379,899.

Patented May 31, 1921.
3 SHEETS—SHEET 1.

Witnesses
Inventor
Charles W. Cathcart.
By Joshua R. H. Potts
His Attorney

C. W. CATHCART.
COUPLING.
APPLICATION FILED MAY 10, 1919.
1,379,899.
Patented May 31, 1921.
3 SHEETS—SHEET 2.
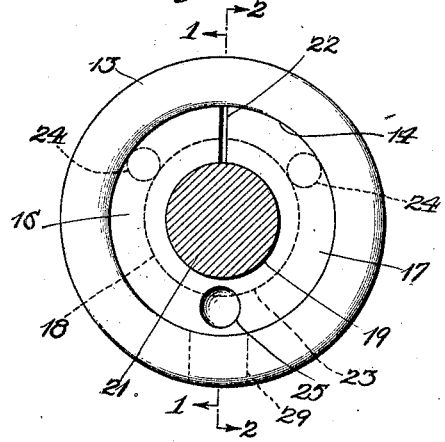
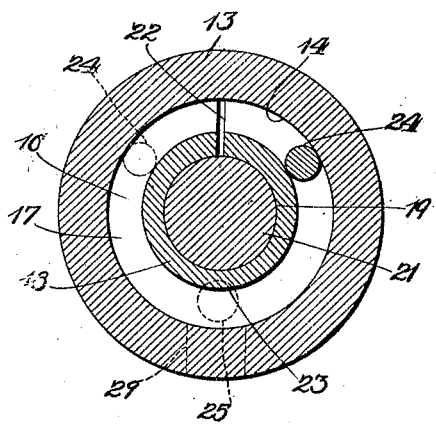
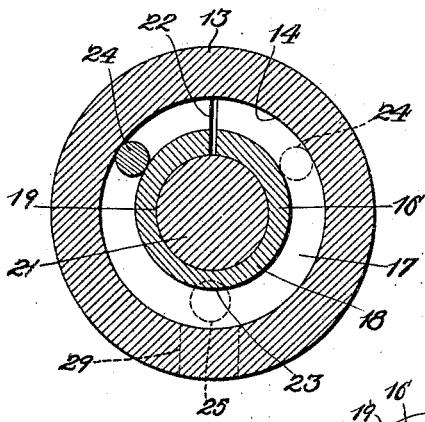
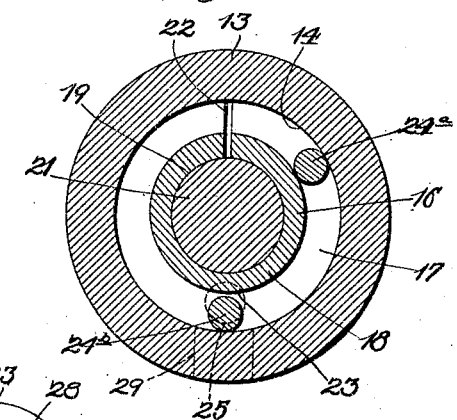
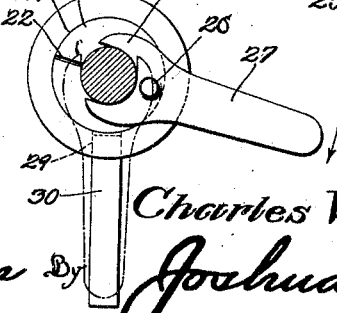
Witnesses
Horace P. Harwood.
Augustus B. Coppes
Inventor
Charles W. Cathcart.
By Joshua R. H. Potts
His Attorney C. W. CATHCART.
COUPLING.
APPLICATION FILED MAY 10, 1919.
1,379,899. Patented May 31, 1921.
3 SHEETS—SHEET 3.
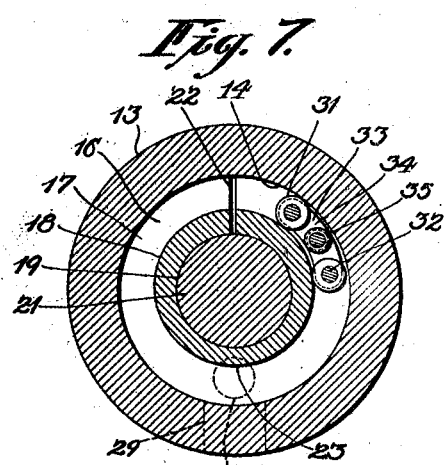
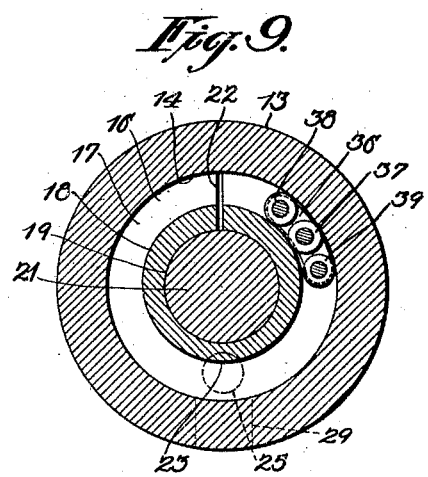
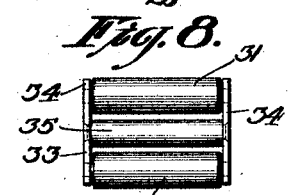
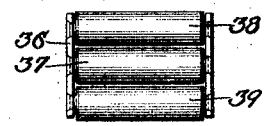
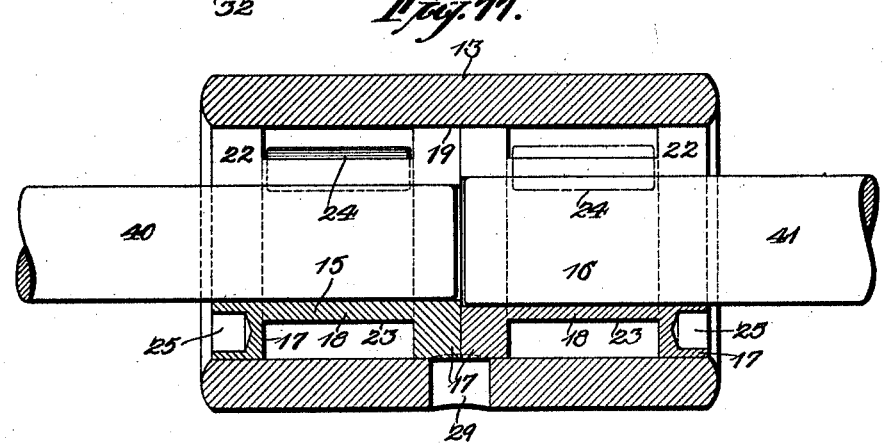
Witnesses
Inventor
Charles W. Cathcart.
By Joshua R. H. Potts
His Attorney

UNITED STATES PATENT OFFICE.

CHARLES W. CATHCART, OF ALEXANDRIA, VIRGINIA.

COUPLING.

1,379,899.  Specification of Letters Patent.  Patented May 31, 1921.

Application filed May 10, 1919. Serial No. 296,073.

*To all whom it may concern:*

Be it known that I, CHARLES W. CATHCART, a citizen of the United States, residing at Alexandria, in the county of Alexandria and State of Virginia, have invented certain new and useful Improvements in Couplings, of which the following is a specification.

One object of my invention is to provide a coupling of simple and durable construction which will be well adapted for use in coupling alined shafts or sections of shafts.

Another object is to so construct my improved coupling that it can be quickly and easily manipulated and placed in operative position.

A still further object is to so make my improved coupling that it can be quickly and easily manipulated and will have no projecting portions which will be dangerous to workmen if the coupling should happen to be touched while rotating.

These objects, and other advantageous ends which will be described hereinafter, I attain in the following manner, reference being had to the accompanying drawings in which—

Fig. 3 is an end view of Fig. 1, looking in the direction of the arrow $x$,

Fig. 4 is a transverse sectional view taken on the line 4—4 of Fig. 1,

Fig. 5 is a view of similar nature to Fig. 4, showing the wedging roller in a different operative position from that shown in Fig. 4, Fig. 6 is a view of similar nature to Figs. 4 and 5, showing two wedging rollers, Fig. 7 is a view of similar nature to Fig. 4, showing two wedging rollers mounted in a frame or carriage and illustrating another form of my invention.

Figure 1:
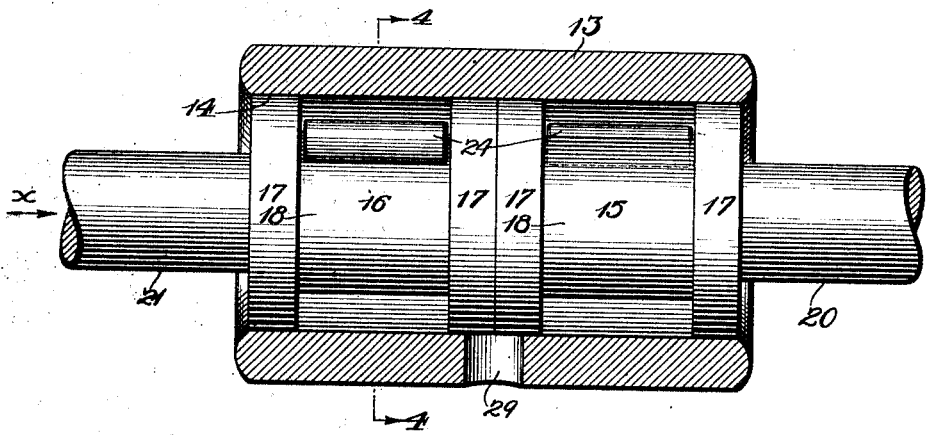
Figure 1 is a longitudinal elevation of my improved coupling, the outer sleeve being shown in section, said section being taken on the line 1—1 of Fig. 3.
Figure 2:
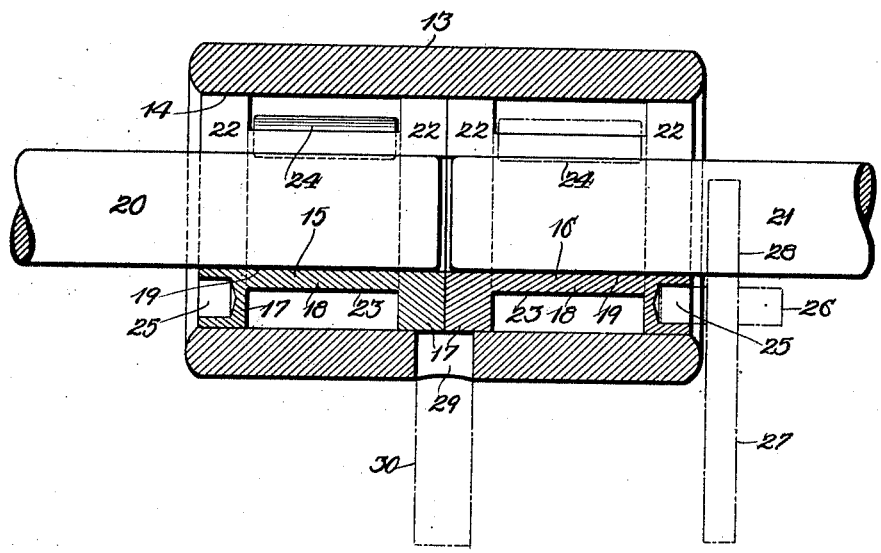
Fig. 2 is a longitudinal sectional elevation taken on the line 2—2 of Fig. 3.

Fig. 8 is a top plan view of the wedging rollers within their carriage as illustrated in Fig. 7, Fig. 9 is a view of similar nature to Fig. 4, showing another modification of my invention in which three wedging rollers are arranged within a frame or carriage; the middle one of the rollers being of greater diameter than the other two rollers, Fig. 10 is a top plan view of the rollers and carriage shown in Fig. 9, Fig. 11 is a view of similar nature to Fig. 2, showing how my invention is adapted to connect two shafts of different diameters, and Fig. 12 is a diagrammatic end elevation showing how the several parts of my improved coupling can be manipulated to lock or unlock the coupling.

Referring to the form of my invention shown in Figs. 1 to 5 inclusive, 13 represents a sleeve which has a cylindrical bore 14 extending longitudinally therethrough from end to end. Two bushings 15 and 16 fit within the bore 14 of the sleeve 13. Each of these bushings includes two flanges 17 at its opposite ends and are spaced apart, the circumferential surfaces of these flanges being designed to freely fit the bore 14. The portion 18 of each of the bushings which is intermediate the flanges 17 has its outer surface made eccentric to the axis of the bore 14 of the sleeve 13 and also eccentric to a central bore 19 in each of the bushings. The bores 19 of the bushings 15 and 16 are concentric to the bore 14 of the sleeve 13 and said bores 19 of the bushings are adapted to respectively receive end portions of the shafts or sections of shafts, such for example as the shafts 20 and 21 as illustrated. Each of the bushings 15 and 16 is split throughout its entire length, as clearly shown at 22 in Figs. 2, 3 and 4. These splits 22 are cut through the thickest parts of the intermediate portions 18 of the bushings, so that adjacent said splits there is less distance between the eccentric surfaces 23 of the portions 18 and the surface of the bore 14 than at points which are diametrically opposite said splits. In other words, there is less space between the bore surface 14 and the surfaces 23 adjacent the splits 22 than between the bore surface 14 and any other portions of the eccentric surfaces 23.

A wedging roller 24 is positioned between the flanges 17 of each of the bushings 15 and 16, the diameter of said wedging rollers being greater than the distance between the bore surface 14 and the portions of the eccentric surfaces 23 adjacent the splits 22. However, these wedging rollers are of less diameter than the width of the space between the bore surface 14 and the portion of the surfaces 23 which are diametrically opposite the splits 22. The outer flanges 17 of the bushings 15 and 16 have cavities 25 which form sockets for a pin 26 on a pin wrench 27, the end of said wrench adjacent the pin 26 being forked or bifurcated, as shown at 28 in Fig. 12, to span the shafts 20 and 21 when the pin 26 is placed in either of the sockets 25. The sleeve 13 has a hole 29 in which a lever-rod 30 can be inserted in the manner shown in Fig. 12 so that the sleeve 13 and bushings 15 and 16 can be relatively rotated until the respective wedging rollers 24 jam between the portions of the eccentric surfaces 23, adjacent the splits 22, and the bore surface 14 of the sleeves 13. This jamming action of the wedging rollers 24 causes the bushings 15 and 16 to be clamped to their respective shafts 20 and 21 and also serves to bind both of the bushings 15 and 16 to the sleeve 13. In this manner, the sleeve 13 is rotatably secured to the shafts 20 and 21 so that if one of the shafts is driven, the driving motion will be imparted to the other of the shafts. It is immaterial in what relative direction the sleeve 13 and bushings 15 and 16 are turned, for example Fig. 4 shows the result of turning the bushings and sleeve oppositely to each other by the aid of the wrench 27 and lever-rod 30; while Fig. 5 shows the result of turning said elements in opposite relative directions.

By the construction above described it will be understood that while the initial binding action is done manually by the aid of the lever-rod 30 and the wrench 27 that after power is applied to either of the shafts 20 or 21, the binding action will be increased and the greater the power of the driving action of the shaft, the greater will be the binding action upon the several elements.

In Fig. 6 I have illustrated a construction including two disconnected wedging rollers 24ª and 24ᵇ within the bushing so that when the bushing and sleeve are turned relatively to each other in one direction, the roller 24ª will serve as a wedging member and when turned in an opposite direction, the roller 24ᵇ will serve as the binding member. With this construction including a plurality of rollers, the jamming action can be secured with a less degree of turning than when only a single roller is employed as above described.

In the form of my invention shown in Figs. 7 and 8, I provide two wedging rollers 31 and 32 which are rotatably mounted in a frame 33, said frame consisting of two plates 34 spaced apart and being tied together by a bar 35; the wedging rollers 31 and 32 being freely rotatable within the plates 34. By this construction, the rollers 31 and 32 can be made of the same diameter and will respectively operate when the parts are rotated in opposite directions.

In Figs. 9 and 10 I have illustrated the form of my invention which includes three rollers arranged in a carriage 36, the middle roller 37 being of greater diameter than the other rollers 38 and 39. The rollers 38 and 39 can be made of the same diameter but the roller 37 is of greater diameter than that of either of the rollers 38 and 39. The difference in diameter between the roller 37 and either of the rollers 38 and 39 is equal to the difference of eccentricity between the points of tangency of the rollers 37 and the roller which is located between the roller 37 and the split 22. With this construction, the central roller 37 will bind at the same time as either of the rollers 38 and 39 irrespective of the direction of relative rotation between the bushing and the sleeve.

Fig. 11 shows how my invention is operative to couple two shafts 40 and 41; the shaft 41 being of greater diameter than the shaft 40. To couple two shafts of different diameter, such as illustrated in Fig. 11, it is merely necessary to bore the bushings at different diameters, the other portions being unchanged.

From the foregoing description it will be understood that in each instance as illustrated the sleeve 13 consists of a simple construction which has a cylindrical bore extending from end to end and the same can be easily made by cutting the desired length of sleeve from a metallic tube. Also the only surface which it is necessary to make eccentric is the surface 23 of each bushing, otherwise the boring is concentric. Also by arranging the construction so that the wedging rollers jam at portions adjacent the splits 22, the bushings readily respond in their contraction upon the shafts so that a comparatively slight wedging action will produce a powerful clamping action upon the shafts and upon the sleeve.

While the member 13 is specifically described as a sleeve it will be noted that this member can be used as a pulley, if so desired, for receiving and transmitting power. Furthermore, while I have specifically described the lever-rod 30 and wrench 27, it will be understood that other tools may be used for moving the members to provide an initial jamming of the wedging rollers, it merely being necessary to provide some means whereby the bushings and sleeve can be turned relatively to each other. However, the structure as specifically described is of advantage for the reason that when the coupling is completed there will be no nuts or other undesirable portions projecting which would be liable to catch in the clothing of and injure a workman.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A coupling of the character described including a sleeve having a bore therein; a bushing having a shaft bore concentric with the bore of said sleeve and integral annular cylindrical flanges adapted to fit within the bore of said sleeve, the portion of said bushing between said flanges having an outer surface eccentric to the bore of said sleeve and out of frictional engagement with said sleeve; and a roller positioned between said eccentric surface and flange of the bushing and the surface forming the bore of said sleeve, said roller being adapted to wedge itself between said eccentric surface and the bore surface of said sleeve, said bushing being split outwardly from said shaft bore; substantially as described.

2. A coupling of the character described including a sleeve having a bore therein; a bushing adapted to fit within said bore and having a portion eccentric to and a shaft bore concentric with said sleeve bore; a roller positioned between said eccentric portion and the bore of said sleeve, said roller being adapted to wedge itself between said eccentric portion and the surface of said sleeve forming its bore, said bushing having a single split, the split extending outwardly from said shaft bore, through the thickest part of said eccentric portion whereby the roller can bear with equal pressure on said eccentric portion at either side of the split; and means fitting within said sleeve for preventing said roller from moving out of said sleeve; substantially as described.

3. A coupling of the character described including a sleeve having a bore therein; a bushing having a shaft bore concentric with the bore of said sleeve and annular flanges adapted to fit within the bore of said sleeve, the portion of said bushing between said flanges having an outer surface eccentric to the bore of said sleeve and out of frictional engagement with said sleeve; and a roller positioned between said eccentric surface and flange of the bushing and the surface forming the bore of said sleeve, said roller being adapted to wedge itself between said eccentric surface and the bore surface of said sleeve, said bushing being split outwardly from said shaft bore; substantially as described.

4. A coupling of the character described including a sleeve having a bore therein extending from end to end; two bushings, each of said bushings having a shaft bore concentric with the bore of said sleeve and annular flanges adapted to fit within the bore of said sleeve, the portion of said bushings between said flanges having outer surfaces eccentric with the bore of said sleeve and out of frictional engagement with said sleeve; and rollers respectively positioned between said eccentric surfaces and flanges of the bushings and the surface forming the bore of said sleeve, said rollers being adapted to wedge between said eccentric surfaces and the bore surface of said sleeve, said bushings being split outwardly from said shaft bore; substantially as described.

5. A coupling of the character described including a sleeve having a bore therein; a bushing adapted to fit within said bore and having an eccentric portion and a shaft bore; a frame; three rollers within said frame whereby the rollers are pivotally held in predetermined set relation to each other, the middle one of said rollers being of greater diameter than the other two rollers, said frame and rollers being positioned between said eccentric portion of the bushing and the bore of said sleeve, said middle roller and one of the rollers at each side thereof being adapted to simultaneously wedge between said eccentric portion and the surface of said sleeve forming its bore when the bushing and sleeve are relatively turned in opposite directions, said bushing being split outwardly from its shaft bore, the difference in diameter of said middle roller and either of said other rollers being equal to the difference in eccentricity between the points of contact of the middle roller and either of the other rollers with said eccentric portion and bore surface of the sleeve; substantially as described.

In testimony whereof I have signed my name to this specification in the presence of two subscribing witnesses.

CHARLES W. CATHCART.

Witnesses:
ELLA HILL,
L. C. CARTER.